Figure 1:
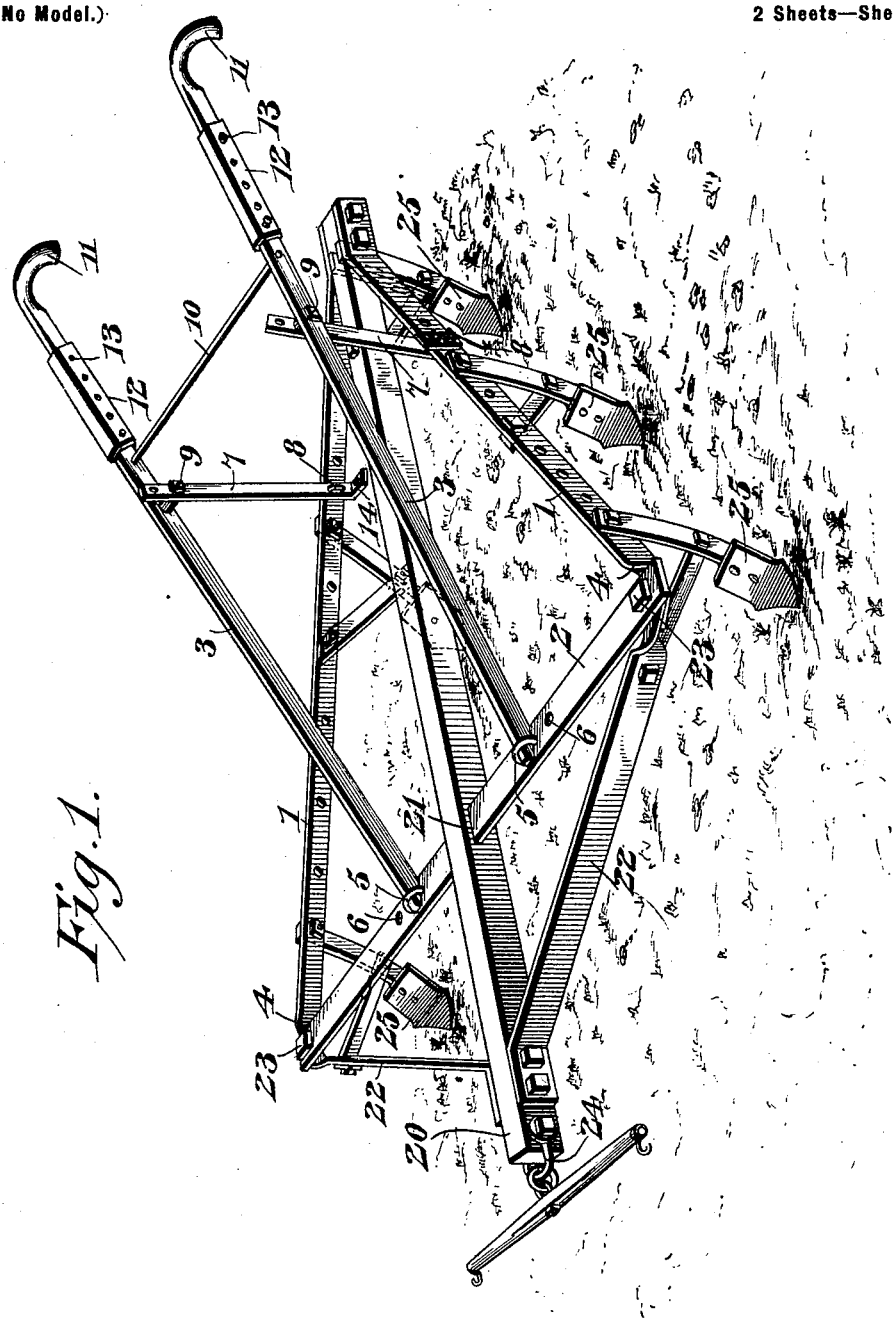

No. 631,767. Patented Aug. 29, 1899.
A. J. ADAMS.
CONVERTIBLE HARROW AND CULTIVATOR.
(Application filed Sept. 24, 1898.)
(No Model.) 2 Sheets—Sheet 1.

Witnesses Andrew J. Adams, Inventor
By his Attorneys,

THE NORRIS PETERS CO., PHOTO-LITHO., WASHINGTON, D. C.

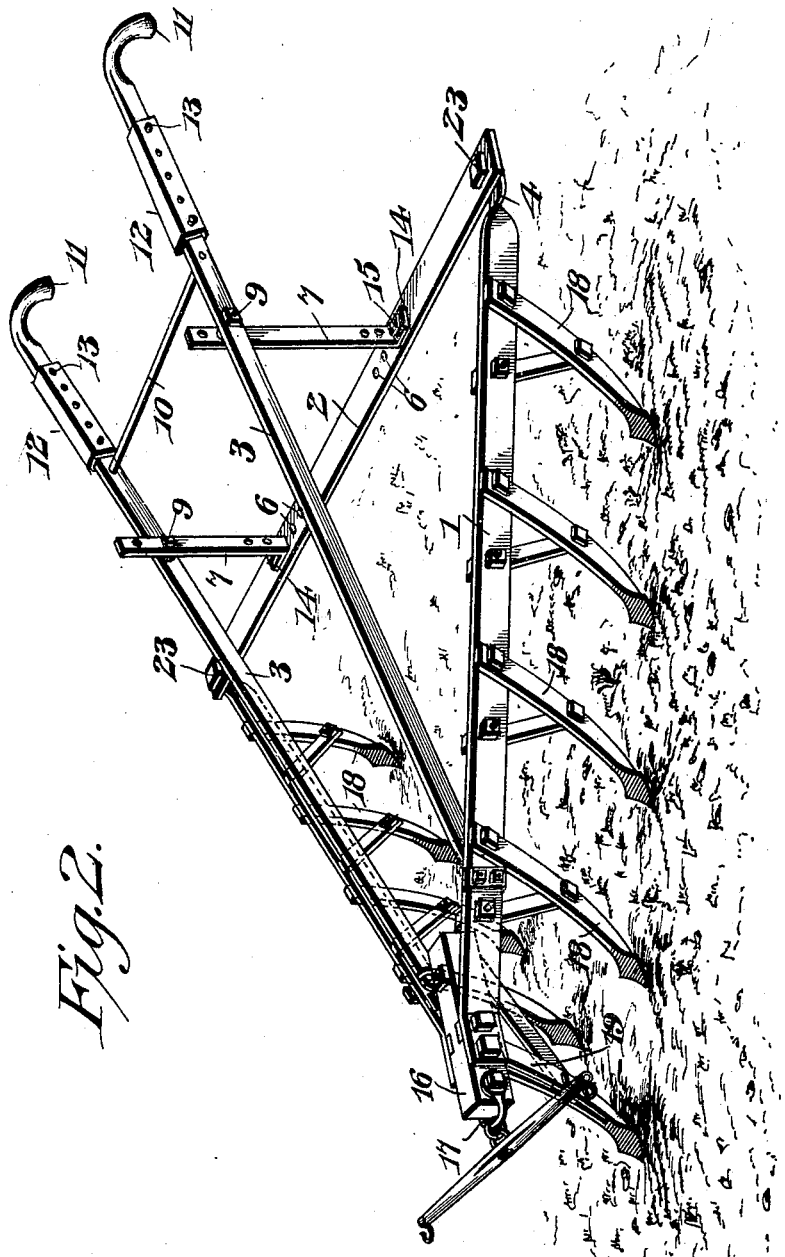

UNITED STATES PATENT OFFICE.

ANDREW J. ADAMS, OF HAMILTON, ALABAMA, ASSIGNOR OF ONE-HALF TO JASON P. FORD, OF SAME PLACE.

CONVERTIBLE HARROW AND CULTIVATOR.

SPECIFICATION forming part of Letters Patent No. 631,767, dated August 29, 1899.

Application filed September 24, 1898. Serial No. 691,820. (No model.)

*To all whom it may concern:*

Be it known that I, ANDREW J. ADAMS, a citizen of the United States, residing at Hamilton, in the county of Marion and State of Alabama, have invented a new and useful Convertible Harrow and Cultivator, of which the following is a specification.

My invention relates to a convertible harrow and cultivator of which the construction is such as to adapt it with a slight change in the relative arrangement of parts to be used in either of its capacities; and the object in view is to provide an agricultural machine of this class which can be operated by means of a single draft-animal and which is light and portable to adapt it particularly for use in plowing corn, cotton, &c.

Further objects and advantages of my invention will appear in the following description and the novel features thereof will be particularly pointed out in the appended claims.

In the drawings, Figure 1 is a perspective view of a machine embodying my invention arranged for use as a cultivator. Fig. 2 is a similar view showing the machine with its parts adjusted for use as a harrow.

Similar numerals of reference indicate corresponding parts in both figures of the drawings.

The essential features of the machine which are common to the two uses thereof are a triangular frame, consisting of diagonally-disposed or convergent side bars 1 and a cross-bar 2, connecting the remote extremities of the side bars, means for attachment of draft apparatus to one end of said triangular frame, the point of application being different according to the proposed use of the machine, and guiding-handles 3, which are mounted upon and extend rearwardly and upwardly from the frame.

The side bars 1 of the triangular or main frame are preferably of cross-sectionally flat material arranged with their widths in vertical planes and having twisted terminals 4 to provide for the attachment thereto of the extremities of the cross-bar 2, which is also of cross-sectionally flat material and is arranged with its width in a horizontal plane. One object I have in arranging this cross-bar in a cross-sectionally flat or horizontal position is to give horizontal strength or stiffness to the frame, while the cross-sectionally vertical arrangement of the side bars gives the necessary vertical strength or stiffness to the frame. This relative arrangement of the side and cross bars is also designed to increase the efficiency of attachment of the handles 3 to the frame, said handles being reversible in position to adapt the machine for performing the different functions above mentioned. For instance, when the machine is adapted for use as a cultivator the cross-bar 2 is foremost and the side bars 1 converge rearwardly from the extremities of said cross-bar and the handles 3 are stepped at their forward ends upon the cross-bar 2 and extend rearwardly and upwardly over the side bars 1. The front extremities of the handles are secured by suitable clamps 5 to the cross-bar 2, and they consist of stirruped or looped bolts, of which the sides or arms engage adjacent openings 6 in said bar, a plurality of the openings being employed to provide for lateral adjustment of the front ends of the handles with relation to the frame. At the points of intersection of the planes of said handles and side bars I erect braces 7, secured by clamps or bolts 8 to the side bars, and suitable bolts, as at 9, to the handles, a plurality of bolt-openings being provided at each point to allow the necessary adjustment of the handles with relation to the plane of the frame. These handles also may be connected by a suitable round 10, and provision may be made for extending the handles to vary the elevations of the grips 11, a simple means of adjustment consisting in sleeves 12, attached, for instance, to the body portions of the handles and having the grip ends adjustably fitted therein, means, such as pins 13, being employed to engage registering openings in the sleeve and grip ends to lock the latter at the desired extension. On the other hand, when the machine is to be used as a harrow the handles are reversed in position with relation to the frame and the front extremities thereof are clamped to the interior surfaces of the side bars at or near those ends which are then foremost, while the braces 7 rise from the cross-bar 2 and are adjustably connected with the handles. Said braces 7 are provided at their lower extremities with offset feet 14, adapted to be secured by means of bolts 15 to said cross-bar, the same bolt-openings 6 which are used in the other positions of the parts for engagement by the clamps 5 being employed for the bolts 15. In the same way the same means may be used in both positions to secure the front extremities of the handles.

When the machine is desired for use as a harrow, the contiguous extremities of the side bars 1 are spaced apart by a draft-block 16, to which is attached a clevis 17 for connection with suitable draft appliances, and with the addition of suitable harrow-teeth 18 to the side bars, together with a bifurcated front tooth 19, the machine is complete for the purpose named. It is obvious that any suitable or preferred construction of harrow-tooth may be employed in this connection to suit the conditions of use. On the other hand, when the apparatus is desired for use as a cultivator and the handles are reversed with relation to the frame to arrange the cross-bar 2 foremost a center draft-beam 20 is employed, extending forwardly from the contiguous rear extremities of the side bars 1 and arranged therebetween substantially as is the draft-block in the harrow form of the machine, said draft-beam also being provided with a transverse opening 21, through which extends the cross-bar 2. Said draft-beam, however, extends forward beyond the cross-bar 2, and connected with the forward extension thereof are the front ends of the forwardly-convergent horizontal braces 22, the rear outer ends of said braces being secured to the angles of the frame by means of bolts 23, which in the harrow form of the machine serve to connect the extremities of the cross-bar 2 with those of the side bars 1. The clevis 24, which is employed for the attachment of the draft appliances, is mounted upon the forward end of the draft-beam 20, and suitable cultivator teeth or plows 25 are attached to the side bars of the frame and to the rear extremities of the draft-beam.

It will be understood that different sizes of frame may be employed to accommodate different numbers of cultivator or harrow teeth and that various other changes in the form, proportion, and minor details of construction may be resorted to without departing from the spirit or sacrificing any of the advantages of the invention. Furthermore, it will be obvious from the foregoing description that the change of the apparatus to adapt it to either of its uses may be accomplished with facility and without loss of time and that the same may be accomplished without the employment of skilled labor.

Having thus described my invention, I claim—

1. An agricultural implement having a triangular frame consisting of angularly-disposed side bars, and a cross-bar connecting the remote extremities thereof, handles having depending braces arranged intermediate their ends, means for securing the forward ends of the handles and the handle-braces interchangeably to the side bars and cross-piece, and draft appliances connected with the frame.

2. An agricultural implement having a triangular frame consisting of angularly-disposed side bars, and a cross-bar connecting the remote extremities of the side bars, handles having depending braces connected therewith intermediate their ends, and means carried by the side bars and cross-bar for interchangeably securing the forward ends of the handles and the handle-braces thereto.

3. An agricultural implement having a triangular frame consisting of angularly-disposed side bars, and a cross-bar connecting the remote extremities thereof, handles having depending braces arranged intermediate their ends, clamps adapted for interchangeable connection with the side bars and cross-bar to receive the forward ends of the handles, brace-securing clamps adapted for interchangeable connection with the side bars and cross-bar, means for connecting the handle ends and braces with their respective clamps, and draft appliances connected with the frame.

4. An agricultural implement having a triangular frame consisting of angularly-disposed side bars, and a cross-bar connecting the remote extremities thereof, handles having depending braces arranged intermediate their ends, clamps adapted for interchangeable connection with the side bars and cross-bar to receive the forward ends of the handles, brace-receiving clamps adapted for interchangeable connection with the side bars and cross-bar, means for connecting the handle ends and braces with their respective clamps, and draft appliances connected with the frame and including a central draft-beam removably fitting in the frame and connecting the convergent extremities of the side bars with the cross-bar intermediate the ends of the latter.

5. An agricultural implement having a triangular frame comprising angularly-disposed side bars and a cross-bar connecting the remote extremities of the side bars, a longitudinal draft-beam removably secured to the frame to connect the adjacent extremities of the side bars with the center of the cross-bar, handles stepped at their front ends upon the frame and extending rearward and upward therefrom, braces connecting intermediate points of the handles with the frame and provided with offset or angularly-disposed feet to seat upon the latter, and handle and brace clamps interchangeably secured to the frame, and supported, one by said side bars and the other by the cross-bar, and adapted to engage the extremities of the handles and the lower ends of said braces to secure them in the desired relative positions to the frame, substantially as specified.

6. In an agricultural implement, the combination of a triangular frame having angularly-disposed side bars, and a cross-bar connecting the remote extremities of the side bars, a draft-beam disposed longitudinally of said frame, and connecting the convergent extremities of said side bars with the center of the cross-bar, the ends of the cross-bar being detachably secured to the adjacent extremities of said side bars, an intermediate portion of the beam having an opening through which said cross-bar extends, and the other end of the beam being located beyond the cross-bar of the triangular frame, obliquely-disposed braces arranged outside of the triangular frame, and each being removably attached at one end to the adjacent end of said cross-bar, and at its opposite end to that portion of the draft-beam which projects beyond the cross-bar of the triangular frame, said braces being arranged to converge in a direction opposite to said side bars, reversible handles having intermediate pendent braces, the front ends of the handles and the lower ends of dependent braces being constructed to be seated interchangeably upon said cross-bar and side bars of the frame, and clamps engaged with said cross-bar and side bars, and with said handle and brace ends, for securing the handles in their adjusted positions, substantially as specified.

In testimony that I claim the foregoing as my own I have hereto affixed my signature in the presence of two witnesses.

ANDREW J. ADAMS.

Witnesses:
JNO. W. HOLLOWAY,
WILL B. FORD.